(12) United States Patent
Naydenov

(10) Patent No.: US 7,905,145 B2
(45) Date of Patent: Mar. 15, 2011

(54) CAPACITIVE GAUGE FOR FUEL TANK

(75) Inventor: Volodia Naydenov, Louvain-La-Neuve (BE)

(73) Assignee: Inergy Automotive Systems Research (S.A.), Brussels (BE)

( * ) Notice: Subject to any disclaimer, the term of this patent is extended or adjusted under 35 U.S.C. 154(b) by 326 days.

(21) Appl. No.: 12/091,086

(22) PCT Filed: Oct. 26, 2006

(86) PCT No.: PCT/EP2006/067834
§ 371 (c)(1),
(2), (4) Date: Jun. 23, 2008

(87) PCT Pub. No.: WO2007/048829
PCT Pub. Date: May 3, 2007

(65) Prior Publication Data
US 2008/0276704 A1    Nov. 13, 2008

(30) Foreign Application Priority Data

Oct. 26, 2005  (FR) ..................................... 05 10935

(51) Int. Cl.
G01R 27/26    (2006.01)
G01F 23/26    (2006.01)
(52) U.S. Cl. ................... 73/304 C; 73/290 R; 73/304 R; 73/313; 324/663; 324/669; 324/678; 324/686
(58) Field of Classification Search ............... 73/290 B, 73/290 R, 304 R, 304 C, 313; 324/658, 663, 324/669, 678, 686
See application file for complete search history.

(56) References Cited

U.S. PATENT DOCUMENTS 3,801,902 A * 4/1974 Horowitz ...................... 324/663
(Continued)

FOREIGN PATENT DOCUMENTS

JP    01092620 A * 4/1989
(Continued)

OTHER PUBLICATIONS

PCT International Report dated Jan. 23, 2007 for International Patent Application No. PCT/EP2006/067384 (2 p.).
(Continued)

Primary Examiner — David A. Rogers
(74) Attorney, Agent, or Firm — Oblon, Spivak, McClelland, Maier & Neustadt, L.L.P.

(57) ABSTRACT

Capacitive gauge for fuel tank comprising a measurement capacitor, a reference capacitor and at least one standard capacitive device, fed by and connected to an electronic interpretation circuit comprising switches for charging and discharging the capacitors and the capacitive device at a certain frequency; an integrator to which the charges of the measurement or reference capacitor can be transmitted and accumulated before being discharged into the standard capacitive device; a comparator for comparing an output value of the integrator with a threshold value; a counter; and a processor or computation unit for calculating the level of liquid in a fuel tank according to the equation:

Figure 1:
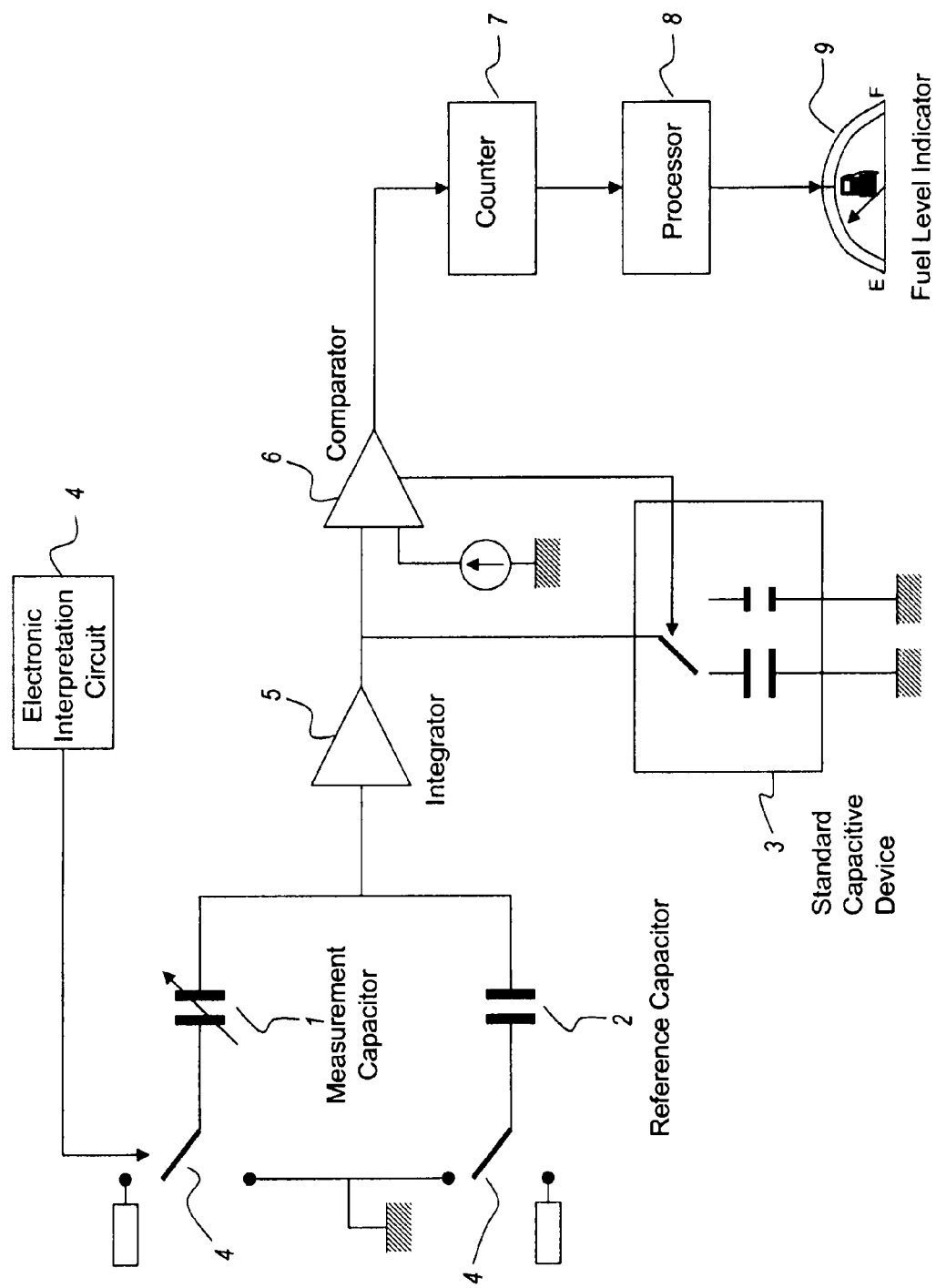

$$h = [n_{ref,empty}/(n_{ref} - n_{ref,empty})] \cdot [(n_{meas} - n_{meas,empty})/n_{meas,empty}],$$

where n are the values read by the counter respectively for the capacitance of the reference capacitor when empty ($n_{ref,empty}$), for the capacitance of the reference capacitor immersed in the fuel ($n_{ref}$), for the capacitance of the measurement capacitor when empty ($n_{meas,empty}$) and for the capacitance of the measurement capacitor in the liquid to be measured ($n_{meas}$); the standard capacitive device comprising at least two standard capacitors with electrical connections to the measurement capacitor.

16 Claims, 1 Drawing Sheet

U.S. PATENT DOCUMENTS

| | | | |
|---|---|---|---|
| 3,827,300 A * | 8/1974 | Thaler | 73/304 C |
| 4,092,860 A * | 6/1978 | Arts et al. | 73/304 R |
| 4,149,213 A * | 4/1979 | Flemons | 361/191 |
| 4,199,984 A * | 4/1980 | Huddart et al. | 73/304 C |
| 4,204,427 A * | 5/1980 | Gothe et al. | 73/304 C |
| 4,214,479 A * | 7/1980 | Maier | 73/304 C |
| 4,259,865 A * | 4/1981 | Myers | 73/304 C |
| 4,295,370 A * | 10/1981 | Bristol | 73/304 C |
| 4,296,630 A | 10/1981 | Jung et al. | |
| 4,388,828 A * | 6/1983 | Dougherty | 73/304 C |
| 4,444,051 A * | 4/1984 | Yamaki et al. | 73/304 C |
| 4,545,020 A * | 10/1985 | Brasfield | 702/52 |
| 4,679,433 A * | 7/1987 | Clinton et al. | 73/304 C |
| 4,743,836 A * | 5/1988 | Grzybowski et al. | 324/678 |
| 4,748,401 A * | 5/1988 | Aldinger | 324/658 |
| 4,947,689 A * | 8/1990 | Hochstein | 73/304 C |
| 5,042,299 A * | 8/1991 | Wells | 73/304 C |
| 5,083,091 A * | 1/1992 | Frick et al. | 324/678 |
| 5,151,660 A * | 9/1992 | Powers et al. | 324/689 |
| 5,175,505 A * | 12/1992 | Magenau et al. | 324/671 |
| 5,451,940 A * | 9/1995 | Schneider et al. | 340/870.37 |
| 5,576,628 A * | 11/1996 | Caliboso et al. | 324/678 |
| 5,600,254 A * | 2/1997 | Berberich | 324/711 |
| 5,652,392 A * | 7/1997 | Lawson | 73/753 |
| 5,659,254 A * | 8/1997 | Matsumoto et al. | 324/678 |
| 5,661,240 A * | 8/1997 | Kemp | 73/514.32 |
| 6,325,979 B1 * | 12/2001 | Hahn et al. | 422/88 |
| 6,474,156 B1 * | 11/2002 | Endo et al. | 73/290 V |
| 6,502,460 B1 * | 1/2003 | Lin et al. | 73/304 C |
| 6,539,797 B2 * | 4/2003 | Livingston et al. | 73/304 C |
| 6,578,416 B1 * | 6/2003 | Vogel et al. | 73/304 C |
| 6,601,462 B1 * | 8/2003 | Ueno et al. | 73/862.337 |
| 6,732,584 B2 * | 5/2004 | Rapala | 73/313 |
| 6,781,388 B2 * | 8/2004 | Wang et al. | 324/690 |
| 6,959,598 B2 * | 11/2005 | Peterson et al. | 73/290 V |
| 6,988,405 B2 * | 1/2006 | Jakoby et al. | 73/304 C |
| 7,084,644 B2 * | 8/2006 | Haider | 324/664 |
| 7,324,029 B2 * | 1/2008 | Wang | 341/143 |
| 2003/0000303 A1 * | 1/2003 | Livingston et al. | 73/304 C |
| 2003/0080871 A1 * | 5/2003 | Schmitt et al. | 340/604 |
| 2004/0007759 A1 * | 1/2004 | Chu et al. | 257/528 |
| 2004/0073386 A1 | 4/2004 | Benedetti | |
| 2005/0218913 A1 * | 10/2005 | Inaba et al. | 324/678 |
| 2008/0223128 A1 | 9/2008 | Naydenov | |
| 2008/0229820 A1 | 9/2008 | Naydenov | |
| 2009/0279345 A1 * | 11/2009 | Baker | 365/148 |

FOREIGN PATENT DOCUMENTS

| | | |
|---|---|---|
| WO | WO0102817 A1 | 1/2001 |
| WO | WO2006064013 A1 | 6/2006 |
| WO | WO2006067148 A2 | 6/2006 |
| WO | WO2006067149 A2 | 6/2006 |
| WO | WO2008049913 A1 | 5/2008 |

OTHER PUBLICATIONS

PCT International Preliminary Report on Patentability dated Apr. 29, 2008 by the International Bureau of WIPO including the Written Opinion provided by EPO for International Patent Application No. PCT/EP2006/067384 (6 p.).

U.S. Appl. No. 60/636,109, filed Dec. 16, 2004, Massa et al.

U.S. Appl. No. 60/949,550, filed Jul. 13, 2007, Thompson et al.

* cited by examiner

CAPACITIVE GAUGE FOR FUEL TANK

The present invention relates to a capacitive gauge for fuel tank having an electronic circuit and using the charge transfer method, and its use as a level gauge in a fuel tank.

Numerous devices have been proposed to date for measuring the level of liquid in the tanks, and in particular, in the fuel tanks of motor vehicles. These known devices normally use level sensors or gauges delivering a signal representative of the level of fuel in the tank.

Some of these level sensors or gauges comprise a measurement capacitor intended to be placed over the entire height of the tank and designed for its capacitance to vary reproducibly with the level of liquid in the tank, and a reference capacitor intended to be positioned in the bottom of the tank so as to be always immersed.

Thus, application WO 01/02817 discloses such a gauge in which the measurement and reference capacitors are fed by and connected to an electronic interpretation circuit comprising switches for charging and discharging the capacitors at a certain frequency, and an integrator, a comparator and a counter. On each charge, the capacitor (measurement or reference) is raised to a given potential (V), from which there results a given charge ($Q = V \cdot C_{meas}$ where $C_{meas}$ is the capacitance of the measurement capacitor). This charge is transferred to the integrator, an output value of which is compared to a predetermined threshold value. As long as the output value of the integrator remains less than the threshold value, the integrator continues to receive, via the capacitor (measurement or reference), a charge $Q = V \cdot C_{meas}$ on each charge. When the threshold value is exceeded, the integrator is discharged into a standard capacitor, raised to the same potential (V) and the cycle recommences. A counter counts the number of times when the threshold is exceeded during a given measurement period, or n. This number is proportional to the capacitance that is measured (measurement or reference capacitance). Now, this capacitance is itself either proportional to the level of liquid in the tank (measurement capacitance), or depends on the nature of the liquid (reference capacitance), except for said capacitance "when empty". The following relation is finally obtained:

$$h = [n_{ref,empty}/(n_{ref} - n_{ref,empty})] \cdot [(n_{meas} - n_{meas,empty})/n_{meas,empty}],$$

where n are the values read by the counter respectively for the capacitance of the reference capacitor when empty ($n_{ref,empty}$), for the capacitance of the reference capacitor immersed in the fuel ($n_{ref}$), for the capacitance of the measurement capacitor when empty ($n_{meas,empty}$) and for the capacitance of the measurement capacitor ($n_{meas}$), and this for a given measurement period (for more details, see the patent concerned, the teaching of which in this regard is incorporated for reference in the present application).

It has been observed that the accuracy of such a gauge is that much better when the capacitance of the standard capacitor is close to that of the "target" capacitor (measurement capacitor or reference capacitor).

Now, the fuels currently used have ethanol contents varying from less than 3% (for "super" type fuels used in Europe) to 100% (for the pure ethanol used in Brazil in particular). Given that water is soluble in ethanol, these fuels can also contain a certain quantity of water. Bearing in mind that the dielectric constant of the fuel has in general a value of at least 1.6, that that of ethanol lies generally between 24 and 25 and that that of water is in general greater or equal to 70, the measurement capacitance of the gauges of the prior art can vary over a band ranging from approximately 50 pF to 2500 pF.

The drawback of the abovementioned gauge according to the prior art lies in the fact that the measurement accuracy is good only for a limited range of fuels.

The present application seeks to resolve this problem by providing a "universal" capacitive gauge, which can be used to measure accurately the level of fuel in a tank regardless of the type of fuel contained in said tank.

To this end, the present invention relates to a capacitive gauge for fuel tank comprising a measurement capacitor, a reference capacitor and at least one standard capacitive device, fed by and connected to an electronic interpretation circuit comprising switches for charging and discharging the capacitors and the capacitive device at a certain frequency; an integrator to which the charges of the measurement or reference capacitor can be transmitted and accumulated before being discharged into the standard capacitive device; a comparator for comparing an output value of the integrator with a threshold value; a counter; and a processor or computation unit for calculating the level of liquid in a fuel tank according to the equation:

$$h = [n_{ref,empty}/(n_{ref} - n_{ref,empty})] \cdot [(n_{meas} - n_{meas,empty})/n_{meas,empty}],$$

where n are the values read by the counter respectively for the capacitance of the reference capacitor when empty ($n_{ref,empty}$), for the capacitance of the reference capacitor immersed in the fuel ($n_{ref}$), for the capacitance of the measurement capacitor when empty ($n_{meas,empty}$) and for the capacitance of the measurement capacitor in the liquid to be measured ($n_{meas}$) the standard capacitive device comprising at least two standard capacitors with electrical connections to the measurement capacitor.

Preferably, these standard capacitors have a capacitance covering a range from 500 pF to 25000 pF, these limits corresponding to a multiple of the charges of the measurement or reference capacitors that have been accumulated in the integrator before being discharged in the standard capacitors.

This gauge is therefore distinguished from the abovementioned one of the prior art by the fact of having at least two standard capacitors for discharging the measurement capacitor, these capacitances being chosen so as to provide a more accurate measurement of the level of fuel for various types of fuel.

Within the context of the invention, the term "gauge" is intended to denote a device that supplies a signal representative of a level of liquid in a fuel tank. According to the invention, this device is an integrated electronic device, that is, it includes an electronic circuit for processing (or interpreting) the signal transmitted by the measurement device, which can be used to determine the level of liquid in the tank.

The gauge according to the invention comprises a measurement capacitor intended to be placed over the entire height of the tank and designed for its capacitance to vary reproducibly with the level of liquid in the tank; a reference capacitor intended to be placed in the bottom of the tank so as to be always immersed; and a standard capacitive device comprising at least two standard capacitors with electrical connections to the measurement capacitor.

The reference and measurement capacitors can be of any known type. They can comprise flat or cylindrical plates, the capacitance of which is influenced by the medium present between them and this by skin effect. Alternatively and preferably, they comprise interdigital (engaging combwise) electrodes which interact by interference effect, as described in U.S. Pat. No. 4,296,630. These electrodes are mounted on an insulating substrate and look like printed circuits; they can moreover be manufactured by manufacturing methods similar to those of printed circuits.

The term "interdigital" electrodes is used to denote electrodes having the form of coils with loops in the form of digits engaged combwise with each other, and this is described in the abovementioned US patent. According to a particularly advantageous variant, the gauge according to the invention comprises a pair of interdigital measurement electrodes, and a pair of reference electrodes, also interdigital, respectively forming the measurement capacitor and the reference capacitor. The pair of electrodes of the latter is preferably located at one end of the substrate (the one that will be placed/fixed on the bottom of the tank) so as to ensure its constant immersion in the liquid present in the tank. The relative height that it occupies in the tank is preferably low relative to that occupied by the pair of measurement electrodes, so that the latter can be present over substantially the entire height of the liquid.

In a particularly preferable way, the digits of the electrodes of the measurement capacitor extend vertically when the gauge is placed in the tank so as to obtain a signal that is substantially linear according to the level of liquid to be measured. Preferably, the loops of the measurement electrode and of the reference electrode are both vertical when the gauge is placed in the tank. Furthermore, they advantageously have at least one electrode partly in common.

The electrical connections between the electrodes of the capacitors according to this variant of the invention and the electronic interpretation circuit are preferably covered by the insulating substrate so as not to disturb the measurement.

As for the standard capacitances, these are components located on a printed circuit including the measurement capacitance and the reference capacitance.

According to the invention, the standard capacitances can be specific either to the measurement capacitor or to the reference capacitor. Alternatively, the measurement and reference capacitors can have at least one standard capacitance in common, ie. they have electrical connections both to the measurement capacitor and to the reference capacitor.

According to the first variant, the device advantageously comprises at least two pairs (four capacitors in all) of standard capacitors: two for discharging the measurement capacitor (and therefore, with electrical connections to the latter), and two for discharging the reference capacitor. Preferably, the gauge according to the invention comprises at least six standard capacitors: three linked to the reference capacitor and three linked to the measurement capacitor respectively, and this in order to ensure a good measurement accuracy over the entire range of fuels.

According to the second variant, the capacitive device can comprise at least two standard capacitors linked only to the measurement capacitor, at least two standard capacitors linked only to the reference capacitor and at least one capacitor that can be linked to both the measurement capacitor and the reference capacitor.

In practice, a capacitive device comprising at least four standard capacitors that can be connected interchangeably to the measurement capacitor or to the standard capacitor is ideal. In particular, such a device with at least six such standard capacitors is ideal.

The gauge according to the invention comprises or is linked to a device enabling the electronic interpretation circuit to connect the measurement capacitor—and the reference capacitor if appropriate—to the "optimal" standard capacitor (the one enabling the measurement accuracy to be optimized). This device can be actuated manually (using a push-button; a manual input on a keyboard or a screen, etc.) by an appropriate person (car manufacturer; pump attendant; vehicle user, etc.). Alternatively, and preferably, this device is an integral part of the electronic interpretation circuit. To this end, the latter can be designed to perform a first measurement of the reference capacitor by choosing a predetermined standard capacitor, so as to roughly evaluate the dielectric constant of the fuel and be able to choose the or each appropriate standard capacitor for optimizing, in a second measurement both of this reference capacitor and of the measurement capacitor, the accuracy.

This second (accurate) measurement is preferably carried out as follows:

1. on starting a measurement, the electronic circuit provokes charging of the measurement capacitor with a given discrete charge and this by means of a correct positioning of the switches,
2. the position of the switches is modified so that the charge is transmitted to the integrator, which accumulates it,
3. the comparator compares an output value of the integrator (normally its voltage) with a threshold value (reference voltage),
4. the points 1 to 3 are repeated cyclically at a certain frequency $v_1$ (charge frequency) until the output value of the integrator is greater than the threshold value,
5. at this moment, the counter is engaged and the integrator is discharged through the chosen standard capacitor,
6. the steps 1 to 3 are repeated cyclically at the frequency $v_1$ until the threshold value is reached for a second time, at which moment the counter is stopped,
7. the steps 1 to 6 are repeated with the reference capacitor and its own standard, as appropriate,
8. the computation unit determines the value of the corresponding liquid level (h).

As for the first measurement, necessary for choosing the appropriate standard capacitor, this is preferably carried out using the steps 1 to 6 described above, and a step 7' during which the computation unit determines the appropriate standard capacitor for measuring the measurement capacitance and, where appropriate, also, the one that is most appropriate for the reference capacitor.

According to this variant of the invention, the counter is therefore a chronometer that can be used to measure the elapsed time between two successive threshold value overshoots. This counter works at a counting frequency $v_2$ which is not necessarily equal to the charge frequency $v_1$. According to a particularly advantageous variant, the counting frequency $v_2$ is greater than the charge frequency $v_1$ and this with a view to increasing the resolution of the gauge. Typically, $v_1$ is measured in hundreds of kHz whereas $v_2$ is measured in tens of MHz.

In practice, with the system described in the abovementioned PCT application, the measurement period is typically of the order of 600 ms, a period during which the counter has counted approximately 2500 threshold overshoots and during which the integrator has received 600 ms*100 kHz=0.6× $10^5$=60000 charges. This results in a period between two threshold overshoots of 600/2500=240 µs, period during which the integrator has received 60000/2500=24 charges. If, according to this variant of the invention, the same charge system is used but, after the first threshold overshoot, a counter (chronometer) is engaged which works at a frequency of approximately 10 MHz (or 0.1 µs between two "pulses"), there is obtained over the period between two threshold overshoots (which remains 240 µs), 240/0.1=2400 beats on the counter. There is therefore obtained at least a similar resolution (2400 compared to 2500 beats on the counter), since the various charge increments on the integrator are not truly discontinuous and there are many of them (the trend of the output value on the integrator as a function of time being a function having the form of a staircase with 24 small oblique treads, therefore tending in reality towards a straight line). However, the measurement period is significantly shorter (measured in μs instead of ms), hence a significantly better gauge response time.

The gauge according to the invention is preferably linked to a device for displaying the level value calculated by the computation unit.

Preferably, the gauge according to the invention is designed to be able to operate permanently when powered by electric current. To this end, the steps 1 to 8 are repeated continuously and cyclically. After each measurement, the value calculated by the computation unit is transmitted to the display device, which holds it in memory and displays it until the next measurement.

In a particular embodiment, the gauge according to the invention may also allow to determine the presence of ethanol and/or water in the composition of the fuel in the tank.

Since the dielectric constant of ethanol lies generally between 24 and 25, the dielectric constant of water is in general greater or equal to 70, and the dielectric constant of fuel has in general a value of at least 1.6, the presence of ethanol and/or water in the fuel composition will be identified by a variation of the dielectric constant of the fuel. Since the reference capacitance is linked to the dielectric constant of the fuel, a variation of the dielectric constant will correspond to a variation of the reference capacitance. As an example, for gauges comprising interdigital (engaging combwise) electrodes, experiments have shown that the presence of 5% of ethanol in the composition of the fuel corresponds to an increase of around 5% of the reference capacitance.

Preferably a warning signal may be indicated in order to prevent damages to the engine when the measurement of the reference capacitance indicates that the fuel composition correspond to the presence in the tank of an unappropriate fuel.

FIG. 1 illustrates structural elements of the gauge including a measurement capacitor 1, a reference capacitor 2, a standard capacitive device 3, an electronic interpretation circuit 4, and integrator 5, a comparator 6, a counter 7, a processor 8, and a fuel level indicator 9.

Finally, the invention also relates to the use of a gauge as described previously as a level gauge in a fuel tank, preferably for a vehicle. It is preferably a gauge with a computation unit as described above. It preferably operates continuously as long as it is fed with electric current, that is, preferably, as long as the engine of the vehicle is running. In the case of motor vehicle tanks, which can have various forms, often complicated to adapt to the space available under the hood, in a particularly advantageous manner, the computation unit applies a correction to the value calculated as described previously, to take into account the form of the tank. Such a correction can be obtained using a table prepared by calibrating the gauge by means of a series of measurements with known quantities of fuel.

The invention claimed is:

1. A capacitive gauge for a fuel tank, comprising:
a measurement capacitor, a reference capacitor and at least one standard capacitive device, fed by and connected to an electronic interpretation circuit including switches for charging and discharging the capacitors and the capacitive device at a certain frequency;
an integrator to which the charges of the measurement or reference capacitor can be transmitted and accumulated before being discharged into the standard capacitive device;
a comparator for comparing an output value of the integrator with a threshold value;
a counter; and
a processor or computation unit for calculating the level of liquid in a fuel tank according to an equation $$h=[n_{ref,empty}/(n_{ref}-n_{ref,empty})]\cdot[(n_{meas}-n_{meas,empty})/n_{meas,empty}],$$

where n are values read by the counter respectively for the capacitance of the reference capacitor when empty ($n_{ref,empty}$), for the capacitance of the reference capacitor immersed in the fuel ($n_{ref}$), for the capacitance of the measurement capacitor when empty ($n_{meas,empty}$) and for the capacitance of the measurement capacitor in the liquid to be measured ($n_{meas}$), wherein the standard capacitive device includes at least two standard capacitors with electrical connections to the measurement capacitor, and the gauge includes or is linked to a connecting device enabling the electronic interpretation circuit to connect the measurement capacitor to an optimal standard capacitor, the connecting device being an electronic device incorporated in the electronic interpretation circuit, the gauge being designed to operate as follows
a) on starting a measurement, the electronic circuit provokes charging of the measurement capacitor with a given discrete charge and this by means of a correct positioning of the switches,
b) the position of the switches is modified so that the charge is transmitted to the integrator, which accumulates it,
c) the comparator compares an output value of the integrator (normally its voltage) with a threshold value (reference voltage),
d) steps a to c are repeated cyclically at a certain frequency $v_1$ (charge frequency) until the output value of the integrator is greater than the threshold value,
e) at this moment, the counter is engaged and the integrator is discharged through the chose standard capacitor,
f) the steps a to c are repeated cyclically at the frequency $v_1$ until the threshold value is reached for a second time, at which moment the counter is stopped,
g) the steps a to f are repeated with the reference capacitor and its own standard, if appropriate,
h) the computation unit determines the value of the corresponding liquid level (h).

2. The gauge according to claim 1, wherein the standard capacitors cover a range from 500 to 25000 pF.

3. The gauge according to claim 1, further comprising at least three standard capacitors with electrical connections only to the reference capacitor and at least three standard capacitors with electrical connections only to the measurement capacitor.

4. The gauge according to claim 1, wherein the gauge is designed to carry out, before the steps a to h, a measurement of the reference capacitor by choosing a predetermined standard capacitor, so as to evaluate the approximate dielectric constant of the fuel and choose the or each appropriate standard capacitor.

5. The gauge according to claim 1, further comprising at least four standard capacitors having electrical connections to both the measurement capacitor and to the reference capacitor.

6. The gauge according to claim 5, wherein the capacitive device includes at least six standard capacitors having electrical connections to both the measurement capacitor and the reference capacitor.

7. A capacitive gauge for a fuel tank, comprising:
a measurement capacitor, a reference capacitor and at least one standard capacitive device, fed by and connected to an electronic interpretation circuit including switches for charging and discharging the capacitors and the capacitive device at a certain frequency;
an integrator to which the charges of the measurement or reference capacitor can be transmitted and accumulated before being discharged into the standard capacitive device;
a comparator for comparing an output value of the integrator with a threshold value;
a counter; and
a processor or computation unit for calculating the level of liquid in a fuel tank according to an equation $$h=[n_{ref,empty}/(n_{ref} \times n_{ref,empty})] \cdot [(n_{meas} \times n_{meas} \times n_{meas,empty})/n_{meas,empty}],$$

where n are values read by the counter respectively for the capacitance of the reference capacitor when empty ($n_{ref,empty}$), for the capacitance of the reference capacitor immersed in the fuel ($n_{ref}$), for the capacitance of the measurement capacitor when empty ($n_{means,empty}$) and for the capacitance of the measurement capacitor in the liquid to be measured ($n_{means}$), wherein
the standard capacitive device includes at least two standard capacitors with electrical connections to the measurement capacitor.

8. The gauge according to claim 7, wherein the standard capacitors cover a range from 500 to 25000 pF.

9. The gauge according to claim 7, further comprising at least three standard capacitors with electrical connections only to the reference capacitor and at least three standard capacitors with electrical connections only to the measurement capacitor.

10. The gauge according to claim 7, further comprising at least four standard capacitors having electrical connections to both the measurement capacitor and to the reference capacitor.

11. The gauge according to claim 10, wherein the capacitive device includes at least six standard capacitors having electrical connections to both the measurement capacitor and the reference capacitor.

12. The gauge according to claim 7, further comprising or being linked to a connecting device enabling the electronic interpretation circuit to connect the measurement capacitor to an optimal standard capacitor.

13. The gauge according to claim 12, wherein the connecting device is actuated manually.

14. The gauge according to claim 12, wherein the connecting device is an electronic device incorporated in the electronic interpretation circuit.

15. The gauge according to claim 14, wherein the gauge is designed to operate as follows
a) on starting a measurement, the electronic circuit provokes charging of the measurement capacitor with a given discrete charge and this by means of a correct positioning of the switches,
b) the position of the switches is modified so that the charge is transmitted to the integrator, which accumulates it,
c) the comparator compares an output value of the integrator (normally its voltage) with a threshold value (reference voltage),
d) steps a to c are repeated cyclically at a certain frequency $v_1$ (charge frequency) until the output value of the integrator is greater than the threshold value,
e) at this moment, the counter is engaged and the integrator is discharged through the chosen standard capacitor,
f) the steps a to c are repeated cyclically at the frequency $v_1$ until the threshold value is reached for a second time, at which moment the counter is stopped,
g) the steps a to f are repeated with the reference capacitor and its own standard, if appropriate,
h) the computation unit determines the value of the corresponding liquid level (h).

16. The gauge according to claim 15, wherein the gauge is designed to carry out, before the steps a to h, a measurement of the reference capacitor by choosing a predetermined standard capacitor, so as to evaluate the approximate dielectric constant of the fuel and choose the or each appropriate standard capacitor.

* * * * *

UNITED STATES PATENT AND TRADEMARK OFFICE
CERTIFICATE OF CORRECTION

PATENT NO.       : 7,905,145 B2
APPLICATION NO.  : 12/091086
DATED            : March 15, 2011
INVENTOR(S)      : Volodia Naydenov It is certified that error appears in the above-identified patent and that said Letters Patent is hereby corrected as shown below:

In column 7, Claim 7, lines 23 and 24 change:
"$h = [n_{ref,empty}/(n_{ref} \times n_{ref,empty})] \cdot [(n_{meas} \times n_{meas} \times n_{meas,empty})/n_{meas,empty}],$" to
to --$h = [n_{ref,empty}/(n_{ref} - n_{ref,empty})] \cdot [(n_{meas} - n_{meas,empty})/n_{meas,empty}],$--.

In column 7, Claim 7, line 29 change: "$(n_{means.empty})$" to --$(n_{meas,empty})$--.

In column 7, Claim 7, line 31 change: "$(n_{means})$" to --$(n_{meas})$--.

Signed and Sealed this
Twenty-first Day of June, 2011

David J. Kappos
*Director of the United States Patent and Trademark Office*